United States Patent [19]

Iwami et al.

[11] Patent Number: 4,974,196
[45] Date of Patent: Nov. 27, 1990

[54] METHOD OF PROCESSING COMMANDS FOR CATALOGED PROCEDURE IN MULTI-WINDOW SYSTEM

[75] Inventors: Hidefumi Iwami, Yokohama; Tetsuo Machida, Tokyo; Fumio Wakamori, Machida; Tsuguo Miyake, Isehara, all of Japan

[73] Assignee: Hitachi, Ltd., Tokyo, Japan

[21] Appl. No.: 246,789

[22] Filed: Sep. 20, 1988

[30] Foreign Application Priority Data

Sep. 21, 1987 [JP] Japan ................. 62-234802

[51] Int. Cl.⁵ .................. G06F 3/14; G06F 15/40; G09G 1/07; G09G 5/32
[52] U.S. Cl. .................. 364/900; 364/256; 364/927.63; 364/462; 364/463; 364/612; 364/641; 364/780; 340/724; 340/799
[58] Field of Search ............ 364/300, 900 MS; 340/724, 799

[56] References Cited

U.S. PATENT DOCUMENTS

| | | | |
|---|---|---|---|
| 4,710,762 | 12/1987 | Yamada | 340/724 |
| 4,794,386 | 12/1988 | Bedrig et al. | 340/724 |
| 4,829,294 | 5/1989 | Iwami et al. | 340/723 |
| 4,914,607 | 4/1990 | Takanshi et al. | 364/521 |

*Primary Examiner*—David Y. Eng
*Assistant Examiner*—Emily Y. Chan
*Attorney, Agent, or Firm*—Fay, Sharpe, Beall, Fagan, Minnich & McKee

[57] ABSTRACT

In a multi-window system, a plurality of windows are set on a display screen, and data processed results are displayed independently for each window, first and second windows are set on the display screen. When an operator inputs a series of commands so as to effect data processing on the first window, the data processed results based on the inputted commands are displayed on the first window, whereas the inputted commands are sequentially displayed in addition to already inputted commands on the second window.

3 Claims, 8 Drawing Sheets

METHOD OF PROCESSING COMMANDS FOR CATALOGED PROCEDURE IN MULTI-WINDOW SYSTEM

BACKGROUND OF THE INVENTION

1. Field of the Invention

The present invention relates to a method of processing commands for a cataloged procedure in a multi-window system, and more particularly to a command processing method by which an operator can process commands with improved workability in storing them in a catalog, executing them, correcting them and the like.

2. Description of the Related Art

As described, e.g., in a Japanese article "UNIX Command Analyzer Shell" in a "BIT" magazine vol. 14, No. 6, pp. 750 to 755, in order to prepare a cataloged procedure in a conventional work station, an operator inputs with an input unit a series of commands to be cataloged, checks the contents of the inputted commands displayed on a screen, corrects them if necessary, and stores them in a catalog.

With the above-described conventional technique, however, an operator who intends to form a catalog cannot explicitly grasp the correspondence between a series of commands to be cataloged and the data processed results thereof at a time, thus leading to poor workability in storing commands in a catalog, executing them, correcting them and the like.

SUMMARY OF THE INVENTION

It is an object of the present invention to solve the above problem and provide a command processing method capable of improving the workability of catalog processing and the like in a system such as a work station provided with a multi-window function.

To achieve the above object, in a multi-window system wherein a plurality of windows are set on a display screen, and data processed results are displayed independently for each window, an aspect of the present invention resides in that first and second windows are set on the display screen, and when an operator inputs a series of commands so as to effect data processing on the first window, the data processed results based on the inputted commands are displayed on the first window, whereas the inputted commands are sequentially displayed on the second window. In this case, in response to an instruction to store the commands displayed on the second window with a catalog name previously designated, the commands can be stored in a catalog file while they are displayed on the second window.

According to the present invention, it is possible to check the correspondence between commands and the processed results on a single display screen. Therefore, it is possible if desired to store programs constructed of the inputted commands in a catalog, after checking the processed results on the display screen. If it becomes necessary to change or correct a part of the commands, an operator designates a command to be changed on a second window for example, and inputs a new command (to see the processed result) on a first window so that a new version of modified commands can be cataloged. If cataloged commands stored in a catalog file are to be executed, the commands are displayed on the second window while displaying the execution results on the first window, with a currently executed command being made distinguishable by a specific marking. Since the correspondence between a command and an execution result is shown clearly, a command to be corrected, if any, can be easily identified.

The foregoing and other objects, advantages, manner of operation and novel feature of the present invention will be understood from the following detailed description when read in connection with the accompanying drawings.

DESCRIPTION OF THE PREFERRED EMBODIMENTS

An embodiment of the present invention will be described with reference to the accompanying drawings.

Figure 1:
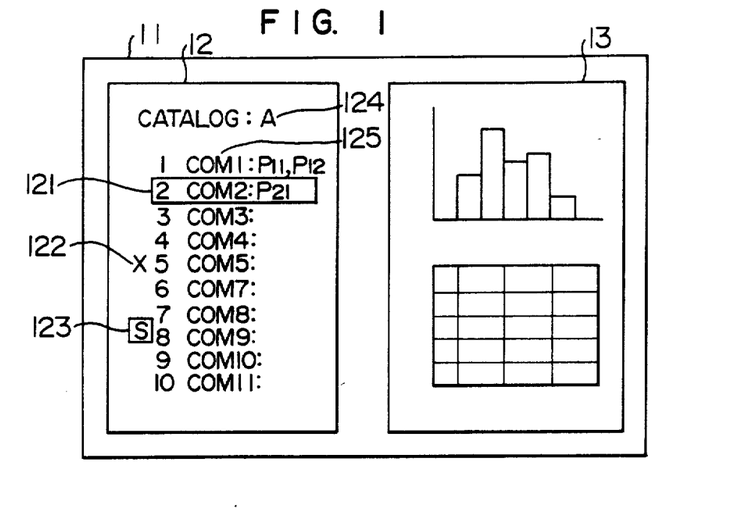
FIG. 1 illustrates the concept of processing commands for cataloged procedure according to the present invention.

FIG. 1 shows the concept of a multi-window screen in connection with which commands for a cataloged procedure are processed. Reference numeral 11 denotes a display screen, and reference numeral 12 denotes a catalog window within which a catalog name 124 and a series of commands 125 for example are displayed. Within a data processed window 13, the data processed results with respect to the commands displayed on the catalog window 12 are sequentially displayed. Within the catalog window 12, indicated by reference numeral 121 is a command identification mark which notifies an operator of the command now under execution, and indicated by reference numeral 122 is a skip mark which is prefixed to a command to be skipped. While executing a program, the command with the skip mark 122 is not executed. Indicated by reference numeral 123 is an interception mark which shows an intercepted point in a series of commands. While executing a program, the execution of cataloged commands is temporarily intercepted just before the command with the interception mark. Upon instruction by an operator to start the execution again, the interception is released. In storing commands in a catalog, the commands to be stored are sequentially displayed on the catalog window 12 while an operator inputs the commands with reference to the display on the data processed window 13.

Figure 2:
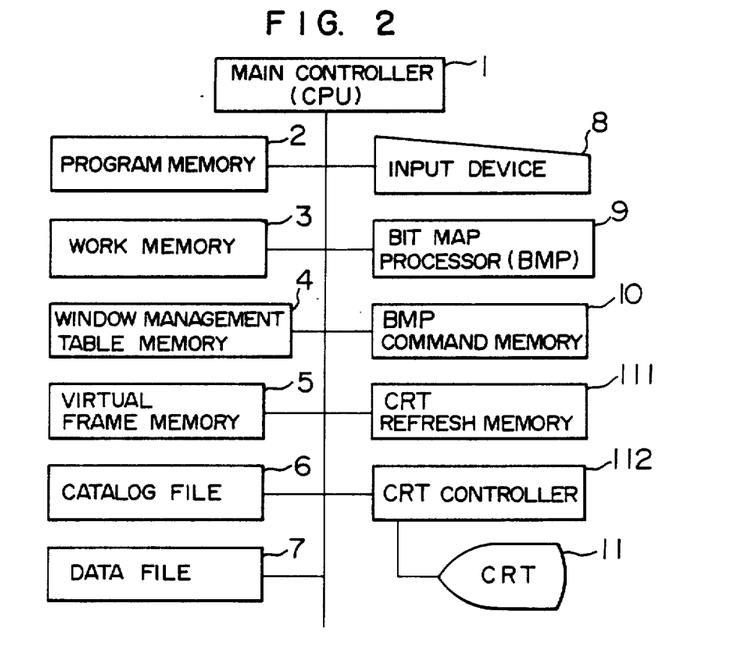
FIG. 2 shows the overall structure of a system embodying the present invention.

FIG. 2 is a block diagram showing an example of the overall structure of a work station applied to the present invention. In FIG. 2, the work station comprises a main controller (CPU) 1 for controlling the operation of the entire system, a program memory 2 for storing programs to be executed by the main controller, a work memory 3 for temporarily storing data during the execution of a program, a window management table memory 4 for storing management data for a display region (window) set on a display screen 11, a virtual frame memory 5 for storing virtual frame data for respective windows, a catalog file 6 for storing a series of cataloged command code data, a data file 7 for storing processed data, and an input device 8 for inputting various data and commands therethrough. The work station further comprises a bit map processor (BMP) 9 for reading data within each window from the virtual frame memory 5, and developing the read-out data in a CRT refresh memory 111 as the bit map data, a BMP memory 10 for storing various instructions to operate the bit map processor 9, and a CRT controller for sequentially reading the contents of the CRT refresh memory 111 and displaying them on the CRT 11.

Figure 3:
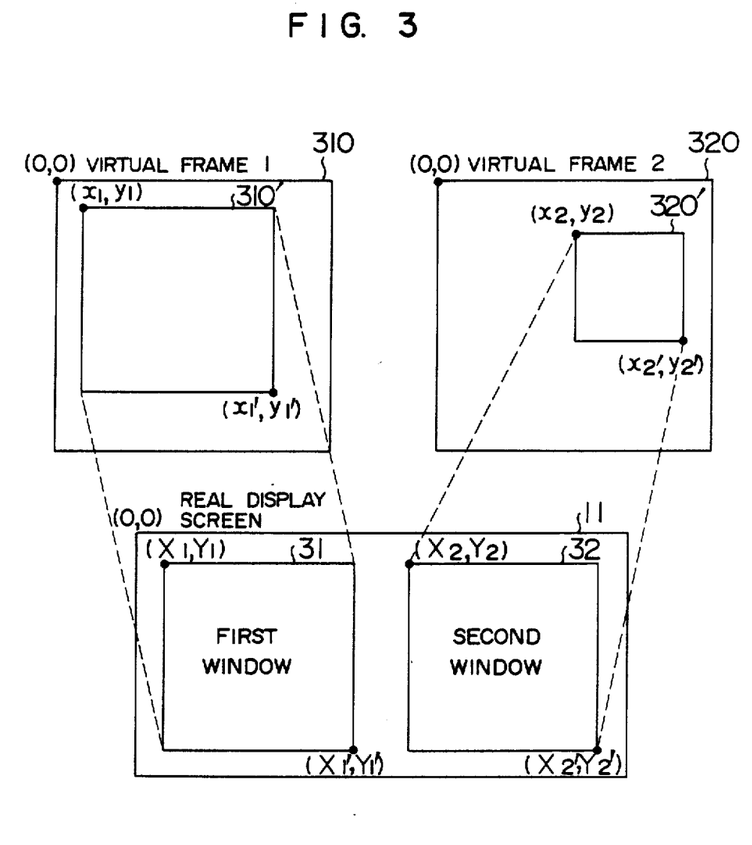
FIG. 3 illustrates a relation between windows on a display screen and windows on virtual frames.

FIG. 3 shows the relation between virtual windows 310' and 320' and first and second real windows 31 and 32, the virtual windows 310' and 320' being formed on first and second virtual frames 310 and 320 stored in the virtual frame memory 5, and the first and second real windows being set on the real display screen 11. In this example, the position and dimension of each real window 31, 32 are defined by the XY coordinates (X1, Y1) of an upper left corner point (representative point) of the window rectangular and the XY coordinates (X1', Y1') of the lower right corner point thereof. Within each real window 31, 32, data within the corresponding virtual window 310', 320' on the virtual frame 310, 320 are displayed. The position and dimension of each virtual window 310', 320' are defined by the xy coordinates of the upper left corner point (representative point) of the window rectangular and the lower right corner point thereof.

Figure 4:
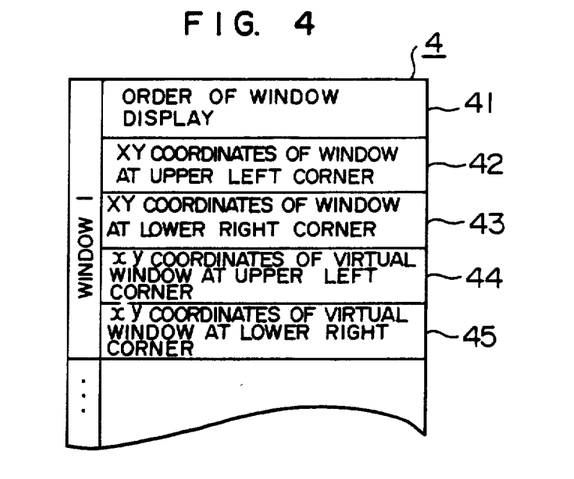
FIG. 4 shows the structure of a window management table.

The relation between the first and second real windows 31 and 32 and the virtual windows 310' and 320' are supervised by the window management table 4 shown in FIG. 4. Stored for each window in the window management table 4 are a priority order 41 of window display, the XY coordinates 42 of the representative point of the real window using the upper left corner point of the real display screen 11 as the coordinate origin, the XY coordinates 43 of the lower right corner point, the xy coordinates 44 of the representative point of the corresponding virtual window using the upper left corner point of the virtual frame as the coordinate origin, and 45 the xy coordinates of the lower right corner point thereof.

Figure 5:
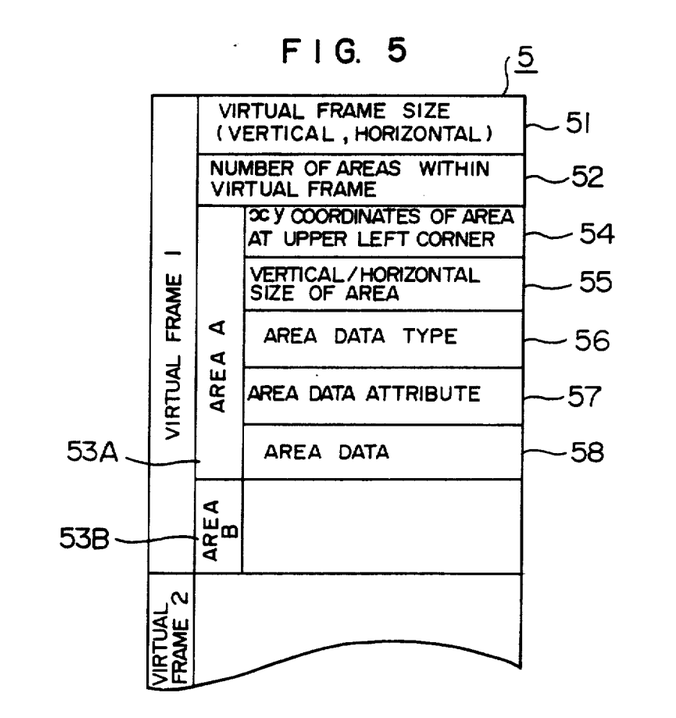
FIG. 5 shows the data structure of a virtual frame.

FIG. 5 shows an example of data items for a virtual frame stored in the virtual frame memory 5. The virtual frame is constructed of a plurality of areas and supervised in units of each area. In FIG. 5, reference numeral 51 denotes the size of a virtual frame in the horizontal and vertical directions, and reference numeral 52 denotes the total number of areas constituting the virtual frame. Reference numerals 53A, 53B, . . . denote definition records of the areas A, B, . . . Each record includes the xy coordinates 54 of the upper left corner point of the area using the upper left corner point of the virtual frame as the coordinate origin, the size 55 of the area in the horizontal and vertical direction, the data type (text, graphics, image) 56 of the area, the data attribute 57 of the area, and the area data 58. The data attribute 57 is constructed of the lateral/vertical writing type, line pitch, character pitch and the like in a case where the data type 56 is a text, constructed of the number of graphics and the like in the case where the data type 56 is a graphics, and constructed of the compression type, gradation number and the like in the case where the data type is an image. The area data 58 is constructed of character code strings in the case where the data type 56 is a text, constructed of the command strings in the case of a graphics, and constructed of the image data in the case of an image.

Figure 6:
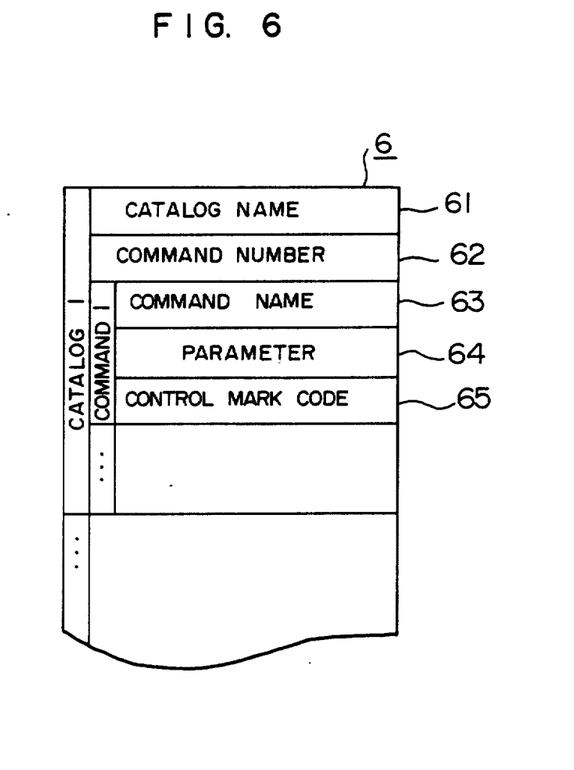
FIG. 6 shows the structure of a catalog file.

FIG. 6 shows a format of the catalog file 6. In FIG. 6, reference numeral 61 denotes a catalog name for identifying each catalog, and reference numeral 62 denotes the total number of commands included in the catalog. The catalog file 6 stores a plurality of catalogs, each catalog containing a plurality of commands. For each command, data items 63 to 65 are stored. Namely, a command name 63 for identifying each command, a parameter 64 for defining the process content of the command, and a control mark code for identifying the control type such as a skip, interception and the like during execution of the catalog.

Figure 7:
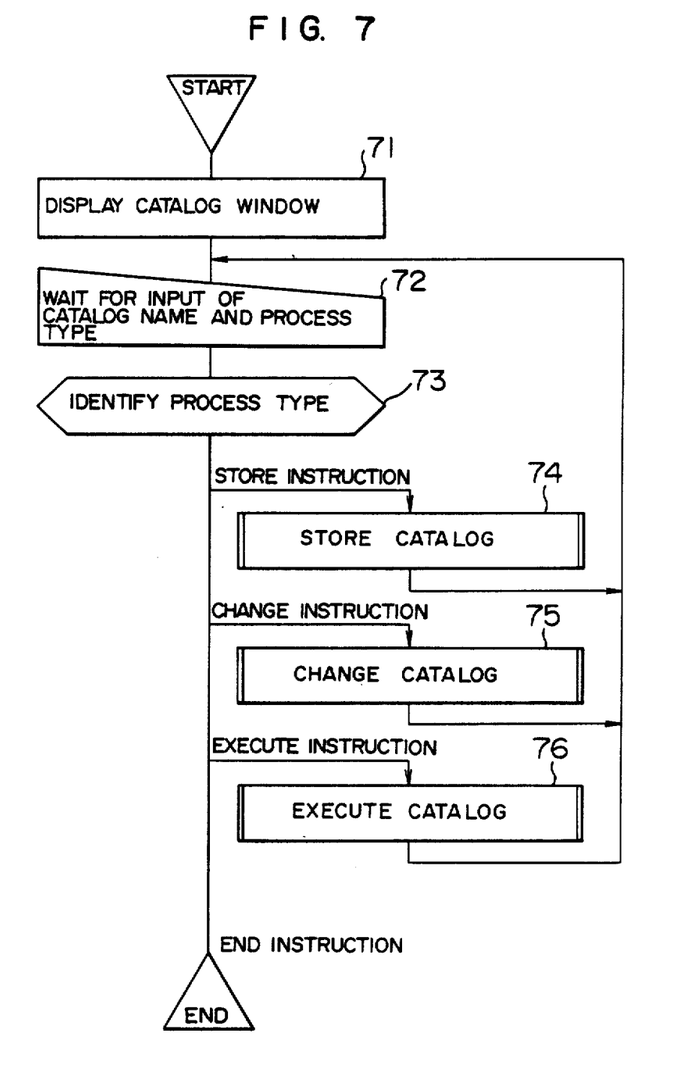
FIG. 7 is a flow chart illustrating an example of a program for realizing a cataloging procedure according to the present invention.

FIG. 7 is a flow chart of the program stored in the program memory 2 which program is called up by the operator after the operator defined the data processed window 13 on the screen and then is executed by the main controller 1. According to this program, at the first step 71, the catalog window 12 is displayed, and the data items 41 to 45 associated with the catalog window are stored in the window management table 4. At the next step 72, the flow waits for an input from the input device 8 by an operator of a catalog name and the process type. Upon input of such data, the process type is identified at step 73 to advance to a particular process. Namely, if the process type is a store instruction, the flow advance to a store catalog routine 74, if a change instruction, to a change catalog routine 75, and if an execute instruction, to an execute catalog routine 76. If an end instruction, the program process terminates.

Figure 8:
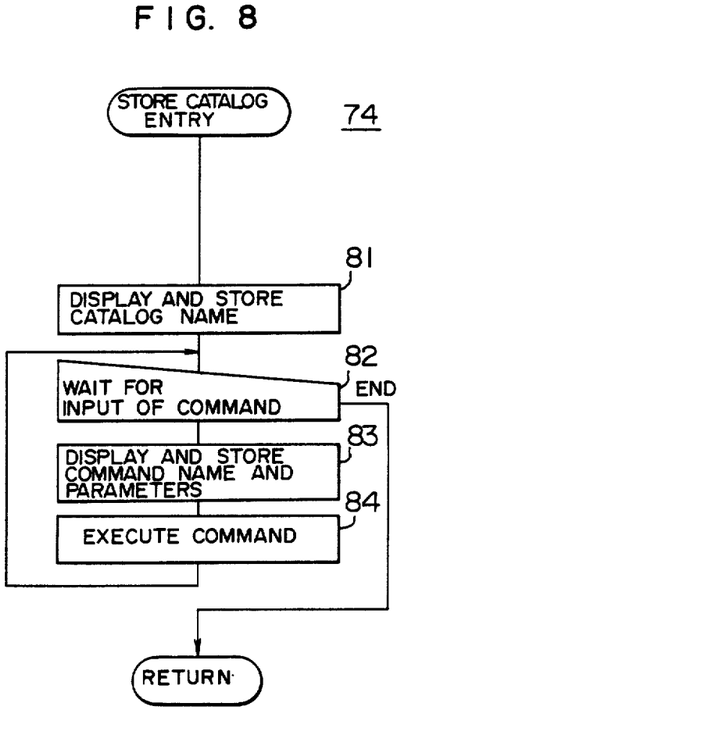
FIG. 8 is a flow chart showing the detail of the store catalog routine 74 shown in FIG. 7.

FIG. 8 is a flow chart showing the detail of the store catalog routine 74. At the first step 81, the catalog name inputted at step 72 of FIG. 7 is displayed on the catalog window 12 and stored in the catalog name area 61 of the catalog file 6. The command number area 62 is initialized at this step. At the next step 82, the flow waits for an input from the input device 8 by an operator of a command on the data processed window 13. Upon input of a command, at step 83 the command name and associated parameters are displayed on the catalog window 12 and stored in the command name area 63 and the parameter area 64 of the catalog file 6. The command number 62 is incremented by one. At step 84, the data processing associated with the command name and parameters inputted at step 82 is executed, and the data processed results are displayed on the data processed window 13.

Figure 9:
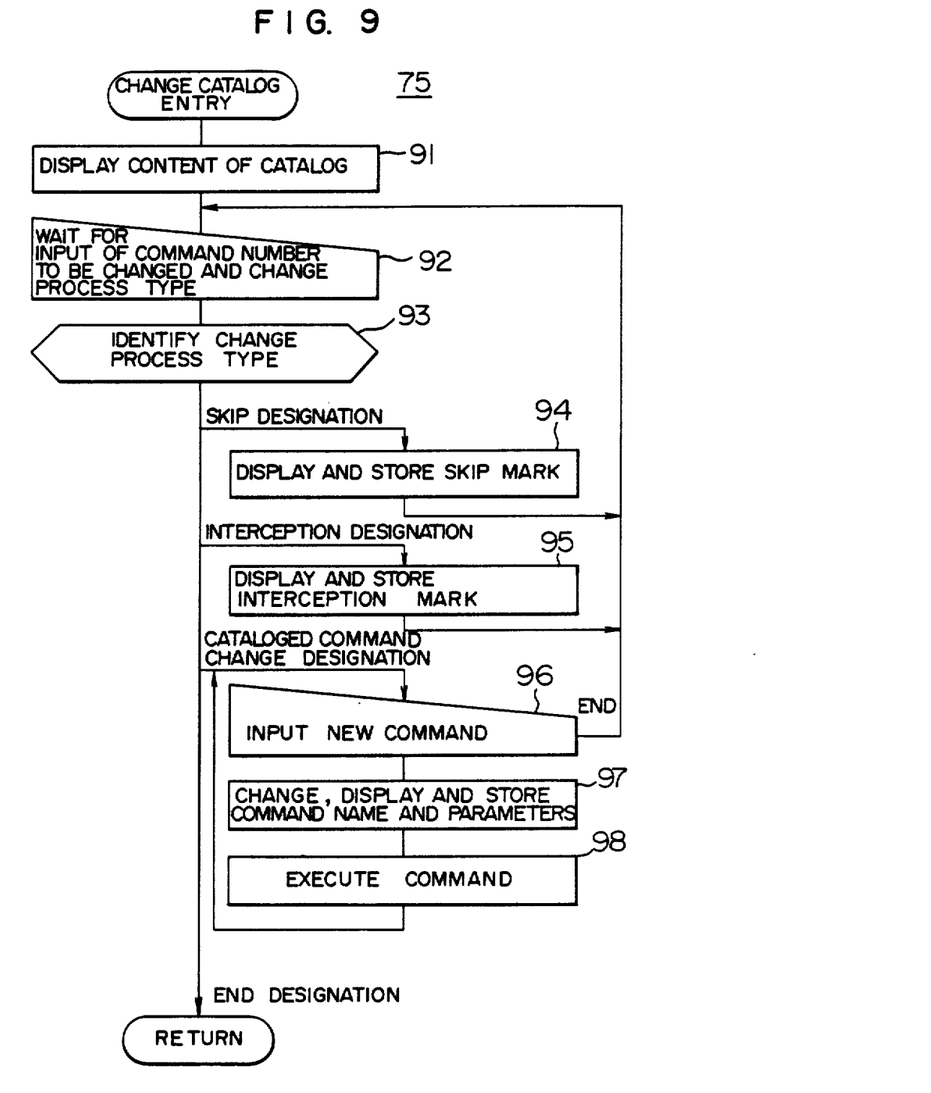
FIG. 9 is a flow chart showing the detail of the change catalog routine 75 shown in FIG. 7.

FIG. 9 is a flow chart showing the detail of the change catalog routine 75. At the first step 91, using as a key the catalog name inputted at step 72 of FIG. 7, the associated catalog data are read from the catalog file 6 and displayed on the catalog window 12. At the next step 92, the flow waits for an input from the input device 8 by an operator of a command number to be changed and the change process type. Upon input of these data, at step 93 the change process type inputted by the operator is identified to advance to a particular control. Namely, if the change process type is a skip instruction, the flow advances to step 94, if an interception instruction, to step 95, and if a catalog command change instruction, to step 96. If an end instruction, the subroutine terminates to return to step 72 of FIG. 7. At step 94, a skip mark 122 is prefixed to the command displayed on the catalog window 12, and the code of the skip mark is stored in the control mark code area 65 of the catalog file 6.

At step 95, an interception mark 123 is prefixed to the command displayed on the catalog window 12, and the code of the interception mark is stored in the control mark code area 65 of the catalog file 6. Upon input by an operator of a new command name and parameters at step 96, these inputted data are replaced with the command name and associated parameters to be changed which have been displayed on the catalog window 12, and are stored in the catalog file 6 at the command name area 63 and the parameter area 64 of the record having the command number to be changed, by replacing the old data with the new data. In this case, the control mark code area 65 is initialized.

Figure 10:
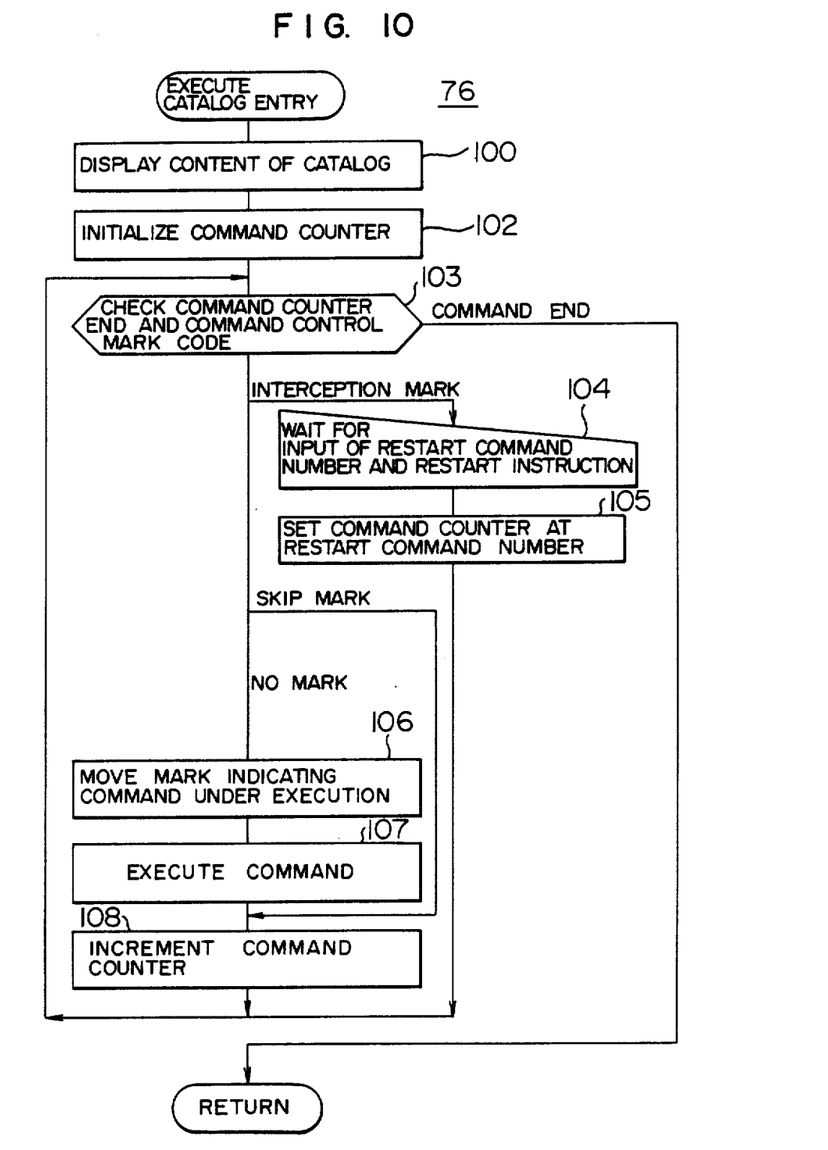
FIG. 10 is a flow chart showing the detail of the execute catalog routine 76 shown in FIG. 7.

FIG. 10 is a flow chart showing the detail of the execute catalog routine 76. At the first step 100, the catalog contents are displayed on the catalog window 12 similar to the case at step 91 of FIG. 9. At step 102, a command counter is initialized in order to sequentially execute the series of cataloged commands. At step 103, the count of the command counter is compared with the command number 62 to judge if all commands have been executed or not. If affirmative, the routine is terminated to return to step 72 of FIG. 7. If not, the control mark code 65 of the command having a command number corresponding to the count of the command counter is identified to move to a particular process. Namely, if the command control mark code is an interception mark code, the flow advances to step 104, and if a skip mark code, the flow advances to step 108. If the control mark code area 65 of the command holds the initialized state, then the flow advances to step 106. At step 104, the flow waits for an input from the input device 8 by an operator of a restart command number and restart instruction. Upon input of these data, the command counter is set at step 105 at the inputted restart command number to thereafter return to step 103. At step 106, the mark 121 indicating a command now under execution is moved to the position of a command having the command number corresponding to the count of the command counter. At step 107, the new command is executed. At step 108, the command counter is incremented by one to return to step 103.

Step 108 may be arranged to advance the command sequence in response to an instruction by an operator, to thus allow the execution speed to be controlled by the operator while recognizing the execution result every time a new command is executed.

As apparent from the foregoing description of the embodiment, according to the present invention, a series of commands and the processed results of command execution are displayed on a single display screen at a time to allow an operator to easily grasp the correspondence therebetween. Therefore, the workability of an operator can be improved in storing commands in a catalog, executing them, correcting them and the like.

We claim:

1. A method of processing commands for cataloged procedure using a multi-window system including a display device having a display screen in which a plurality of windows are established, virtual screen memory means for forming a plurality of virtual screens each of which stores display data obtained by executing a program corresponding to said virtual screen, memory means for storing a window management table to define a corresponding relationship between said virtual screens and said windows, data processing means for executing a plurality of programs to store display data in said virtual screens and for referencing the window management table to output display data in a predetermined region of said virtual screen to a window corresponding to the virtual screen, and catalog file means for storing at least one sequence of cataloged command codes, comprising the steps of:

setting a set of control data in said window management table by said processing means to establish a first window for displaying data processed results of input commands from an operator on said display screen;

setting a set of control data in said window management table by said processing means to establish a second window for displaying a sequence of commands to be cataloged on said display screen;

in response to a command inputted by the operator in said first window while executing another program for displaying said inputted command in addition to a sequence of already inputted commands on said second window to form a command list, executing by said data processor means a program for displaying said inputted command in addition to a sequence of already inputted commands on said second window to form a command list and for storing said inputted command in a catalog memory area in addition to a sequence of already inputted commands stored in said catalog memory area; and executing said inputted command by said data processing means according to the program corresponding to said first window to display the data processed result of said inputted command on said first window.

2. The method according to claim 1, further comprising the steps of:

inputting by said operator a command for requesting said data processing means to initiate a program for the correction of said command list displayed on said second window; and executing said correction program by said data processing means, in response to an input operation by said operator, thereby correcting the display contents on said second window and the contents of said catalog file means.

3. The method according to claim 2, wherein said input operation by said operator includes inputting a control code for intercepting the execution of said cataloged command sequence at a designated position in said command list.

* * * * *